United States Patent
Heidjann et al.

(10) Patent No.: US 6,789,379 B2
(45) Date of Patent: Sep. 14, 2004

(54) METHOD AND ASSEMBLY FOR SUPPORTING AN AGRICULTURAL IMPLEMENT

(75) Inventors: Franz Heidjann, Harsewinkel (DE); Bernd Holtmann, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 40 days.

(21) Appl. No.: 10/184,599

(22) Filed: Jun. 27, 2002

(65) Prior Publication Data

US 2003/0014955 A1 Jan. 23, 2003

(30) Foreign Application Priority Data

Jun. 27, 2001 (DE) .......................... 101 30 653

(51) Int. Cl.$^7$ ...................... G06T 165/00; A01D 75/28

(52) U.S. Cl. ................................. 56/10.2 E

(58) Field of Search ............... 56/10.2 R, 10.2 E, 56/10.2 D, 10.2 F, 208, DIG. 15, 210, 219, 322

(56) References Cited

U.S. PATENT DOCUMENTS

| | | | | |
|---|---|---|---|---|
| 4,414,792 A | * | 11/1983 | Bettencourt et al. | ...... 56/10.2 E |
| 4,507,910 A | * | 4/1985 | Thornley et al. | ........ 56/10.2 E |
| 4,944,141 A | * | 7/1990 | Orlando et al. | .............. 56/17.1 |
| 5,463,854 A | * | 11/1995 | Chmielewski et al. | ... 56/10.2 E |
| 5,471,825 A | * | 12/1995 | Panoushek et al. | ....... 56/10.2 E |
| 5,867,970 A | * | 2/1999 | Ehrhart et al. | ................... 56/6 |

FOREIGN PATENT DOCUMENTS

| | | |
|---|---|---|
| DE | 1 108 972 | 6/1961 |
| DE | 41 25 603 | 4/1997 |
| DE | 199 18 551 | 10/2000 |

\* cited by examiner

Primary Examiner—Robert E Pezzuto
(74) Attorney, Agent, or Firm—Husch & Eppenberger, LLC; Robert C. Haldiman

(57) ABSTRACT

A support for an agricultural implement carried on a receiving device of an agricultural machine includes at least one support wheel connected with the receiving device. A support wheel assembly for use with the disclosed method includes a support wheel and a wheel lifting cylinder connecting the support wheel with the receiving device. The load on the support wheel is adjustable via the wheel lifting cylinder. Adjustment is controlled in response to load sensors.

19 Claims, 3 Drawing Sheets

METHOD AND ASSEMBLY FOR SUPPORTING AN AGRICULTURAL IMPLEMENT

TECHNICAL FIELD OF THE INVENTION

The present invention relates generally to agricultural machinery and, more particularly, to a method and assembly for supporting an agricultural implement on an agricultural machine.

DESCRIPTION OF THE RELATED ART

German Patent No. 199 18 551 discloses a generic agricultural harvesting machine which is designed as a forage harvester and which at the front has an intermediate attachment which receives an agricultural implement. So the load of the agricultural implement does not have to be supported exclusively via the front axle of the carrier vehicle, associated with the intermediate attachment are support wheels which make it possible for at least part of the mass of the agricultural implement to be supported during road transport. Thus the front axle of the carrier vehicle does not have to support the whole load of the agricultural implement. Adaptation of the support wheels to the intermediate attachment of the agricultural machine does however require considerable reinforcement of this intermediate attachment, because when travelling over uneven terrain considerable shock loads can arise and have to be absorbed by the intermediate attachment. Because the axles of the support wheels are arranged directly on the intermediate attachment of the agricultural harvesting machine, a vertical movement of the support wheels relative to this intermediate attachment is not possible. As a result, when the intermediate attachment is raised the load transmitted by the support wheels to the ground gradually decreases and becomes equal to zero the moment the support wheels have lost contact with the ground. The decrease in support function of the support wheels when the intermediate attachment is raised therefore requires, in spite of the support wheel assembly, dimensioning of the axles of the agricultural harvesting machine according to the maximum possible load.

The present invention is directed to overcoming one or more of the problems set forth above.

SUMMARY OF THE INVENTION

An aspect of the present invention is to provide a method and assembly for providing support for an agricultural implement carried on a receiving device of an agricultural machine.

Another aspect of the invention is to provide a system whereby one support wheel provides load relief on the axles of an agricultural harvesting machine, resulting in the ability to construct machines having axles that are less materially-intensive and, therefore, less expensive to manufacture.

In accordance with the above, there is provided a method for providing support for an agricultural implement carried on a receiving device of an agricultural machine that includes the steps of providing at least one support wheel connected with the receiving device and adjusting the load on the support wheel. In a preferred embodiment, the method also includes the step of providing a wheel lifting cylinder associated with each support wheel and the step of adjusting the load on the support wheel includes adjusting the position of the support wheel with the wheel lifting cylinder. In another preferred embodiment, the method further includes the steps of measuring the loads on a drive axle and steering axle of the agricultural harvesting machine and the step of adjusting the load on the support wheel includes adjusting the load on the support wheel as a function of the loads on the drive axle and the steering axle.

A support wheel assembly for use with the disclosed method includes a support wheel and a wheel lifting cylinder connecting the support wheel with the receiving device, wherein the load on the support wheel is adjustable via the wheel lifting cylinder. In a preferred embodiment, the wheel lifting cylinder adjusts the support wheel in a generally vertical direction. In another preferred embodiment, the assembly includes load-sensing transducers associated with a drive axle and steering axle of the of the agricultural machine and at least one electronic calculating unit in communication with the first and second load-sensing transducers and wherein the electronic calculating unit generates a control signal as a function of the loads on the drive and steering axles.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
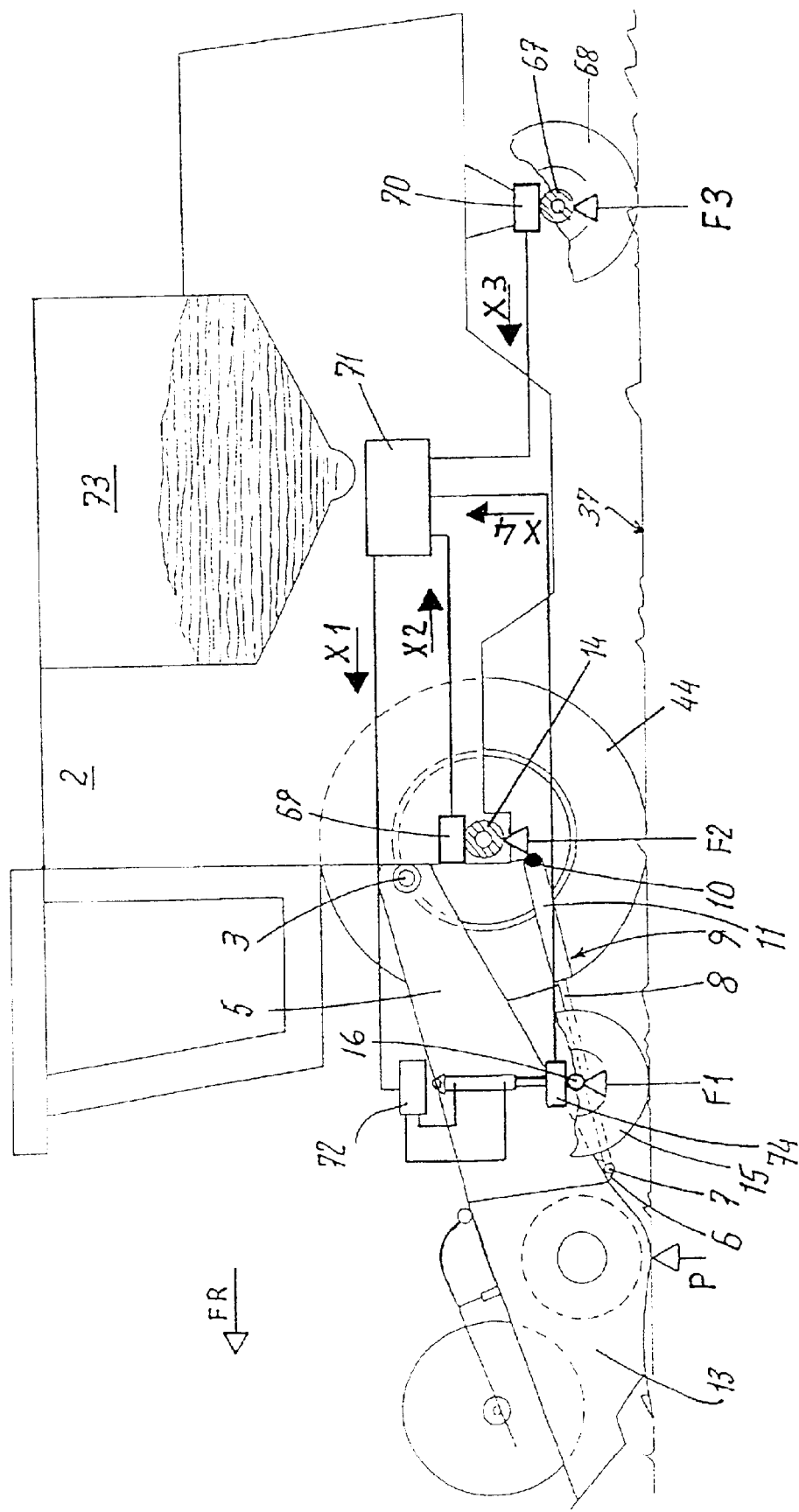
FIG. 1 is a side view of an agricultural harvesting machine embodying the present invention and incorporating a support wheel assembly.

FIG. 1 illustrates an agricultural harvesting machine in the form of a combine harvester 2. The combine harvester 2 carries a receiving device 5 (shown as a feed rake in this embodiment) at its front end. The receiving device 5 carries an agricultural implement 13, which is in the form of a grain header in the embodiment shown. The receiving device 5 is mounted on pivot shaft 3, which is transverse to the direction of travel FR, thereby allowing the receiving device 5 to pivot in a vertical direction. Holding flanges 6 are integrally formed with the receiving device 5 on its lower side. The holding flanges 6 receive piston rods 8 of lifting cylinders 9 so that cylinders 9 are pivotable about an axis 7 pointing transversely to the direction of travel FR. The lifting cylinders 9 are mounted at and are pivotable about axis 10, which points transversely to the direction of travel FR. By pressurizing the lifting cylinders 9 or relieving them of pressure, the piston rods 8 move out of cylinders 11 of the lifting cylinders 9 or enter them. This facilitates a pivot movement of the receiving device 5 in a vertical direction about the pivot shaft 3. The lifting cylinders 9 also provide support for the receiving device 5.

Figure 2:
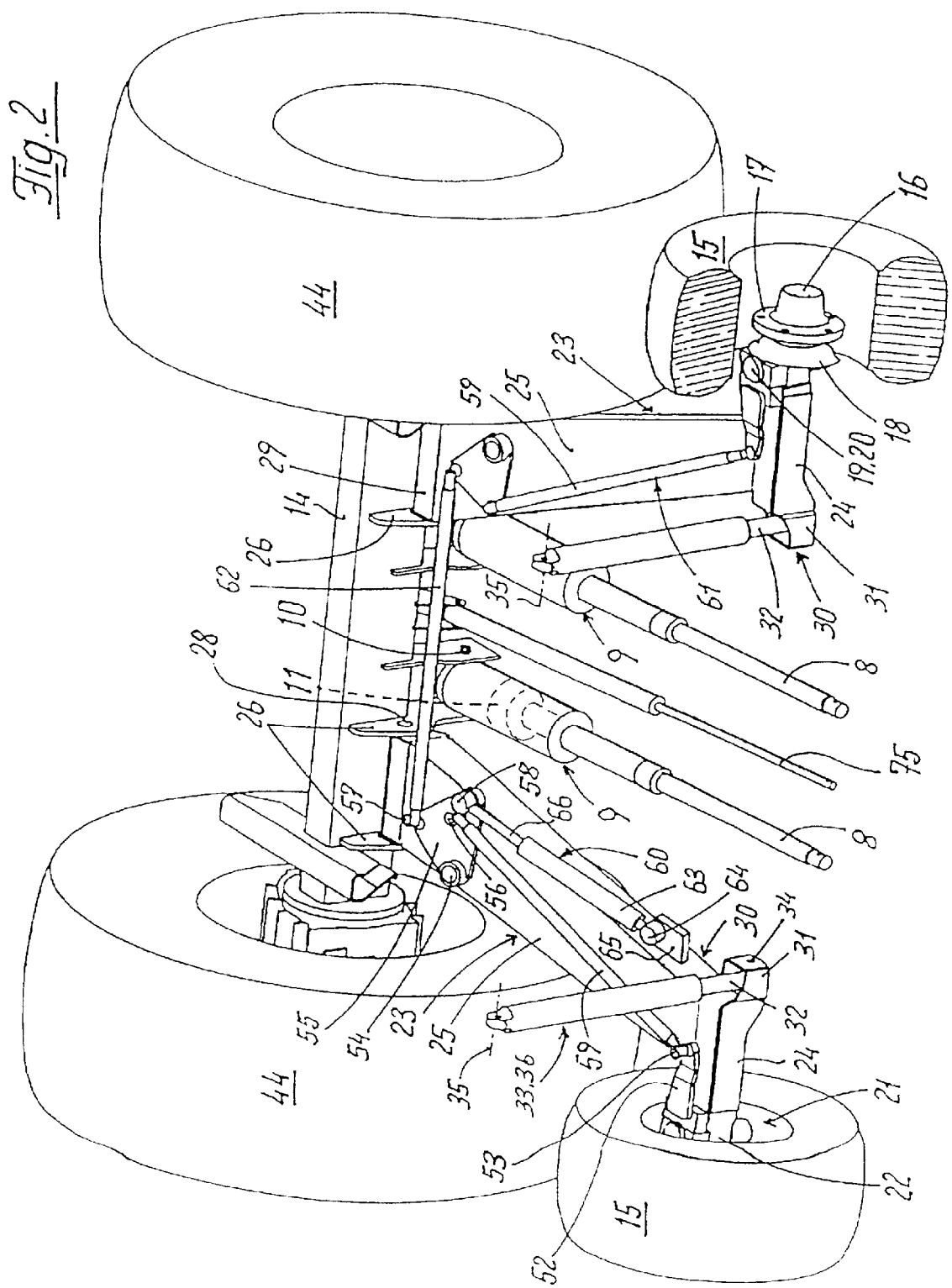
FIG. 2 is a perspective view of an embodiment of a support wheel assembly.

Referring to FIG. 2, support wheels 15 are connecting with the receiving device 5 at the region between the agricultural implement 13 and a front axle 14 of the machine 1 in order to provide additional support for the receiving device 5 and the agricultural implement 13. Each support wheel is provided with a wheel axle 16. A hub 17 surrounds the wheel axle 16. A receiving flange 18 is integrally formed with the hub 17 at its inner end at the region of the support wheels 15. A pivot shaft 20 passes through the receiving flange 18 and points in a vertical direction. In the embodiment shown, the pivot shaft 20 is an axially locked bolt 19. The pivot shaft 20 also passes through a guide eye 22 at a rim region 21 of the support wheels 15. A supporting arm 23 is attached to the other end of the guide eye 22. In the embodiment shown, associated with each support wheel 15 is such a supporting arm 23, wherein each supporting arm 23 includes a head piece 24 at its end receiving the respective support wheel 15. An angle profile carrier 25 is welded to the head piece 24 at the carrier vehicle side. The angle profile carrier 25 has a cross-section increasing in the direction of the front axle 14 of the carrier vehicle 1.

Holding flanges 26 are associated with the front side of the front axle 14 of the agricultural machine 1. Shafts 28 pass through the holding flanges 26 (shown in this embodiment as axially locked bolts) and are transverse to the direction of travel FR. Flange-like extensions 29 of the angle profile carriers 25 traverse the gap between adjacent holding flanges 26 and are held in place by the shafts 28. The angle profile carriers 25 are thereby pivotable in a vertical direction about shafts 28. This arrangement forms a pivotable connection between the supporting arm 23 of support frame 30 and the front axle 14 of the agricultural harvesting machine 1.

A holding strap 31 is formed integrally with the head piece 24 of the first supporting arm 23 on the side facing away from the respective support wheel 15. The holding strap 31 receives the front end of a piston rod 32 of a lifting cylinder 33 so that it is pivotable about an axis 34 pointing transversely to the direction of travel FR. The cylinder end of the lifting cylinder 33 is attached to the receiving device 5 of the agricultural harvesting machine 1 so that it is pivotable about a shaft 35 also arranged transversely to the direction of travel FR. Thus the respective lifting cylinder 33 forms a further supporting arm 36 of the support frame 30, which pivotably connects the support wheel 15 to the receiving device 5 of the agricultural harvesting machine 1. In this way, each of the support wheels 15 is connected by a support frame 30 consisting of a first supporting arm 25 and at least one further supporting arm 36 to both the agricultural harvesting machine 1 and the receiving device 5.

In an alternate embodiment, the support frame 30 is designed in one piece and is arranged on the agricultural harvesting machine 1 so that it is pivotable via one or more pivot axes 28 arranged transversely to the direction of travel FR. In other embodiments, the receiving device 5 is supported on the agricultural harvesting machine 1 by only one lifting cylinder 9 or any number of lifting cylinders 9.

This arrangement permits the association of the support wheels 15 with the receiving device 5 can be varied in a vertical direction, so that the support wheels 15 can always touch the ground 36 irrespective of the position of the receiving device 5. This construction makes it possible to adjust the support load F1 of the at least one support wheel 15 to be supported on the ground 37. It is within the scope of the invention that associated with the receiving device 5 are a plurality of support wheels 15 at least some of which transmit support loads F1 adjustable by means of lifting cylinders 33 to the ground 37. In one embodiment, the multiple support wheels 15 are adjustable independently of one another. A particularly advantageous embodiment of the support wheels 15, which will be described in more detail below, is achieved if this adjustability of the support load F1 also allows regulation of the bearing pressure p of the agricultural implement 13 on the ground 37.

Figure 3:
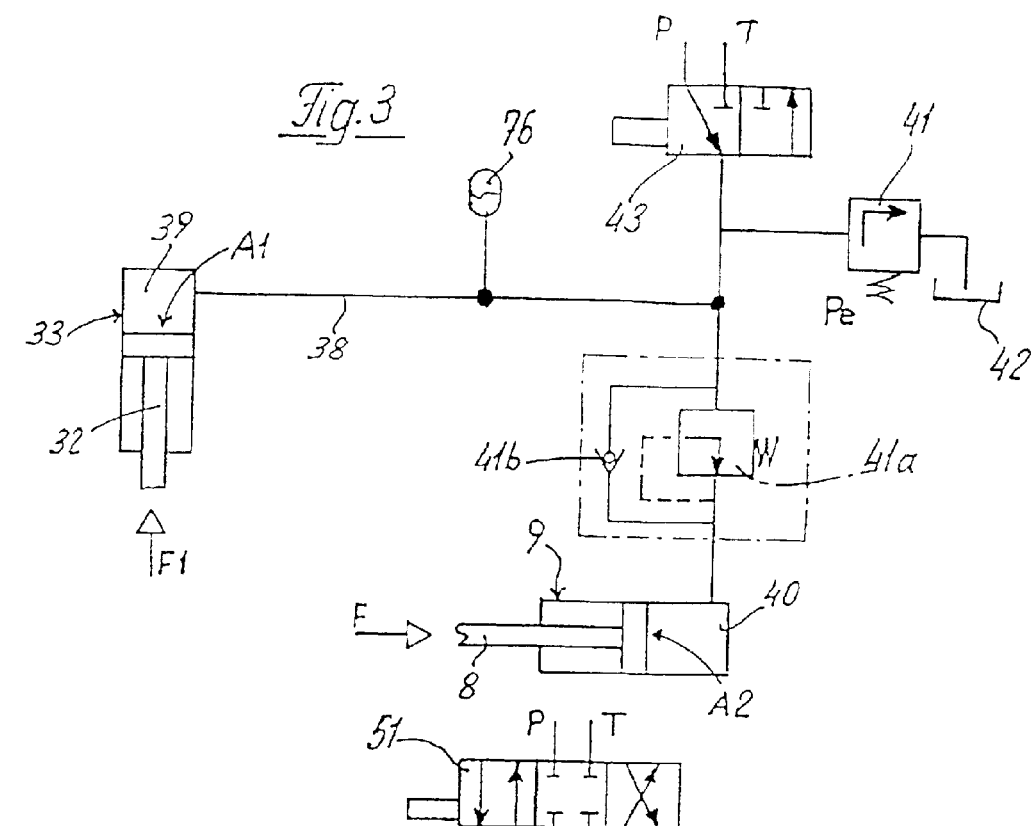
FIG. 3 is a schematic view of one fluid powered control system for the support wheel assembly.

FIG. 3 illustrates a control system for one embodiment of a wheel support assembly. The lifting cylinder 33 of the support wheel 15 and the lifting cylinder or cylinders 9 of the receiving device 5 are single-acting lifting cylinders. A system conduit or pipe 38 connects the piston face side of the pressure chambers 39, 40 of the lifting cylinders 33, 9, respectively. The system pipe 38 has at least one pressure-limiting valve 41 which limits the pressure in the system pipe 38 and, on exceeding the pressure threshold value $P_c$ which is adjustable at the pressure-limiting valve 41. The pressure-limiting valve is connected to the tank 42, so that a portion of the energy-transmitting medium can run off into the tank 42. It is contemplated that the parallel-connected pressure-limiting valve 41 can be replaced by a pressure-limiting valve 41a connected in series with the at least one lifting cylinder 9 of the receiving device 5 and which separates the lifting cylinder 9 of the receiving device 5 from the system pipe 38 as soon as the pipe pressure has reached the set value $p_c$. Both embodiments create the possibility of limiting to a fixed value the support load F transmitted by the lifting cylinder or cylinders 9 of the receiving device 5 to the axle 14 of the agricultural harvesting machine. Thus, the support load F2 at the axle 14 of the agricultural harvesting machine 1 can be limited to a fixed value.

So that the piston rod 8 of the lifting cylinders 9 can nevertheless retract when the pressure-limiting valve 41a is blocked, associated with the pressure-limiting valve 41a at its simplest is a non-return valve 41b which opens in the direction of an accumulator 76. As a result, operationally related pressure peaks in the pressure chamber 40 on the piston side of the lifting cylinder or cylinders 9 of the receiving device 5 can be reduced even when the pressure-limiting valve 41b is closed.

A switchable 2/2-port directional control valve 43 is also connected to a pump P integrated in the agricultural harvesting machine 1 and to a tank T. Pressurization of the system pipe 38 causes the piston rods 8, 32 to extend out of the respective lifting cylinders 9, 33. In the process the receiving device 5 performs a pivot movement about its upper pivot shaft 3 to a position removed from the ground. At the same time the at least one support wheel 15, which is arranged on the receiving device 5 so as to be vertically movable by the other lifting cylinder 33, moves towards the ground to ensure that the at least one support wheel 15 contacts the ground 37. Because the lifting cylinders 9, 33 coupled together are single-acting, gravity-related lowering of the receiving device 5 simultaneously leads to also gravity-related retraction of the lifting cylinder 33 which receives the at least one support wheel 15 vertically movably. Such a design ensures that the ratio between the support load F1 to be transmitted by the at least one support wheel 15 and the support load F to be transmitted to the land wheels 44 of the adjacent front axle 14 is constant. This ratio corresponds to the ratio of the piston faces A1, A2 of the coupled lifting cylinders 9, 33.

Figure 4:
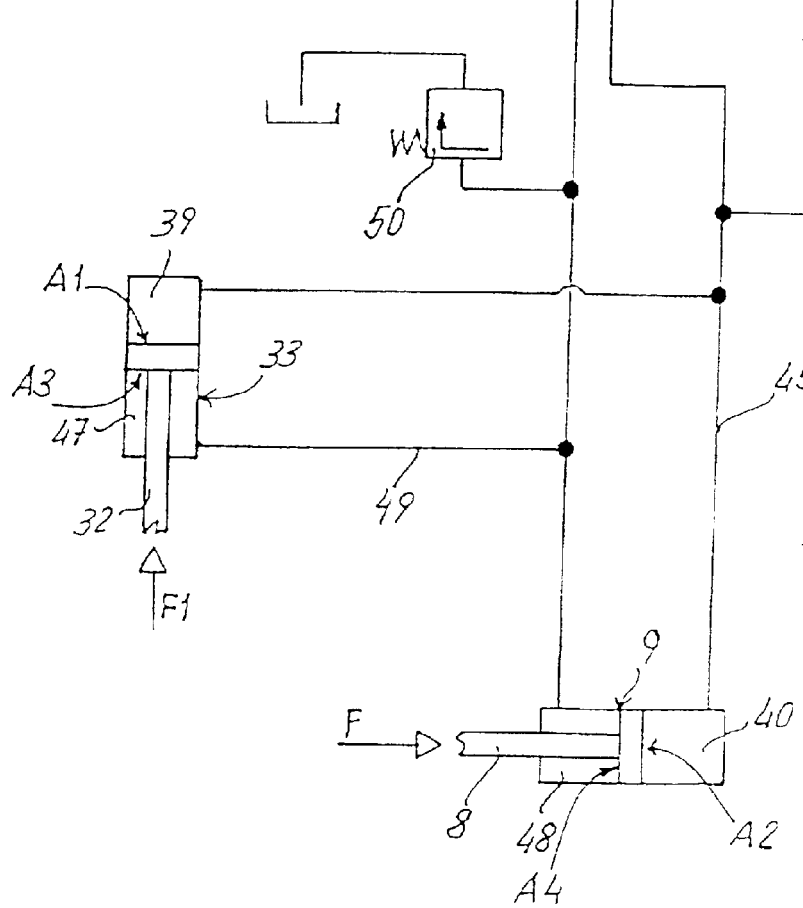
FIG. 4 is a schematic view of another fluid powered control system for the support wheel assembly.

The lifting cylinders 9, 33 (which are single-acting in FIG. 3) can also be double-acting as shown in FIG. 4. Here, the pressure chambers 39, 40 on the piston face side are connected by a pipe system 45 to each other and to an adjustable pressure-limiting valve 46. The pressure chambers 47, 48 on the piston rod side of said lifting cylinders 9, 33 are also connected by a pipe system 49 to each other and to a pressure-limiting valve 50. Both pressure-limiting valves 46, 50 correspond in function to the pressure-limiting valve 41 already described when using single-acting lifting cylinders 9, 33. Via a 3/2-port directional control valve 51 the pipe systems 45, 49 and hence the lifting cylinders 9, 33 are connected to the pump P and the tank T of the agricultural harvesting machine 1. When using double-acting lifting cylinders 9, 33 too, pressurization of the pressure chambers 39, 40 on the piston face side leads to lifting of the receiving device and lowering of the at least one support wheel 15. Conversely, pressurization of the pressure chambers 47, 48 on the piston rod side of the lifting cylinders 9, 33 coupled together leads to lowering of the receiving device 5 with simultaneous lifting of the at least one support wheel 15. With this design too it is ensured that the at least one support wheel 15 has permanent contact with the ground 37, wherein here the support load ratios F1/F now depend on the ratio of the piston faces A1 and A2 and on the ratio of the piston faces A3 and A4 on the piston rod side. It is contemplated that accumulators 76 according to FIG. 3 can be associated with the pipe systems 38 or 45, 49, to avoid sudden loading.

The support wheels 15 shown in FIG. 2 can also be pivotable about the vertical pivot shaft 20, wherein the bolt 19 forming the pivot shaft 20 is encompassed at the top by a steering lever 52 with which is associated at one end a stud 53 pointing in a vertical direction. The supporting arm 23 which receives the respective support wheel 15 has, at its end associated with the front axle 14 of the agricultural harvesting machine 1, a stud 54 pointing in a vertical direction. On the stud 54 is pivotably arranged an angle lever 55 with which are in turn associated non-rotatably a plurality of studs 56, 57, 58. A first coupling rod 59 connects the stud 53 of the steering lever 52 pivotably to a stud 56 arranged on the angle lever 55, wherein the coupling rod 59 extends in the direction of the front axle 14 of the agricultural harvesting machine 1 above and in the region of the angle profile carrier 25 of the respective supporting arm 23. In the embodiment shown, associated with the adjacent support wheels 15 are steering levers 52, coupling rods 59 and angle levers 55 which are arranged inversely symmetrically to each other and which in each case form a partial steering mechanism 60, 61 for the respective support wheel 15. In the region of the front axle 14, the two partial steering mechanisms 60, 61 are coupled to each other by a connecting strut 62 pivotably connected to the rear studs 57 of the angle levers 55. Pivotably associated with one of the angle levers 55 via a further stud 58 is a steering cylinder 63 which at the other end is received by a holding flange 65 attached to the angle profile carrier 25, so that it is also pivotable about a vertical axis 64. By pressurization of the double-acting steering cylinder 63, the piston rod 66 can be moved out of the steering cylinder 63 or into it, wherein the support wheels 15 perform pivot movements in the same direction about their vertical pivot shafts 20. It is within the scope of the invention that only one support wheel 15 which is steerable according to the invention or a plurality of support wheels 15 which are steerable according to the invention are associated with the agricultural harvesting machine 1 or, if there is more than one support wheel 15, only some of the support wheels 15 are steerable. Also, the steering movement of the steered axle 67 of the agricultural harvesting machine 1 with its land wheels 68 and the steering movement of the support wheels 15 according to the invention can be coupled to each other.

The agricultural harvesting machine 1 should be steered and driven reliably. Accordingly, as shown in FIG. 1, associated with each axle 14, 67 of the agricultural harvesting machine 1 is at least one load-sensing transducer 69, 70 which is, for example, a wire strain gauge for determining the deflection of the axles 14, 67 or a pressure sensor for determining the tire pressure of the land wheels 44, 68. The load-sensing transducers 69, 70 generate as a function of the respective support load F2, F3 input signals X2, X3 which in an electronic calculating unit 71 generate, as a function of a load distribution ratio which is predefined and if necessary variable as desired, an output signal X1 which via a switching valve 72 of any design leads to pressurization or relief of pressure of the lifting cylinder 33 of the at least one support wheel 15. In this way it is possible to adjust the support load F1 of the at least one support wheel 15 as a function of the support loads F2, F3 of the axles 14, 67 of the agricultural harvesting machine 1. Further, associated with the at least one support wheel 15 can be a load-sensing transducer 74 which generates an input signal X4 which is dependent upon the support load F3 and which in the electronic calculating unit 71 can be used as a measure of the pressure p acting on the ground 37 by the agricultural implement 13. In this way it is possible to adjust the support load distribution as a function of support of the agricultural implement 13 on the ground 37 as well.

Because agricultural harvesting machines designed as combine harvesters 2 have a crop storage device 73, the mass of the agricultural harvesting machine 1 and hence the support loads F2, F3 applied to the axles 14, 67 varies constantly. To achieve continuous adaptation of the support load F1 of the support wheel 15 in spite of support loads F2, F3 varying during the harvesting process, the switching valve 72 can be designed as a proportional valve 72 known in the art whose control signal X1 leads to permanent adaptation of the support load F1 to the varying mass of the agricultural harvesting machine 1.

In order that, during lifting and lowering of the support wheel 15, the effect of this change of position on the support load F1 of this support wheel 15 remains small, the lifting cylinder 33 which allows the change of position is arranged in an essentially vertical direction on the receiving device 5. If adaptation of the support load F1 of the support wheel 15 to the other support loads F2, F3 is not effected, it is contemplated that the lifting cylinder 33 of the support wheel 15 can also be blocked in a manner known in the art and therefore not described.

To ensure, even when there is no agricultural implement 13, that the support wheels 15 according to the invention support a minimum load on the ground 37, on the one hand the lifting cylinders 9 which pivot the receiving device 5 can be designed as double-acting lifting cylinders 9, so that by means of the piston rod 8 retracting into the cylinder 11 of the lifting cylinders 9 it can be fixed how high the load to be supported on the ground 37 by the support wheels 15 is to be. If the lifting cylinders 9 which pivot the receiving device 5 are single-acting, between the receiving device 5 and the agricultural harvesting machine 1 can be interposed a traction cylinder 75 which under pressurization forces the support wheels 15 according to the invention onto the ground 37, wherein by pressurization of the traction cylinder 75 the quantity of the load F1 to be supported can be determined.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. A support wheel assembly for an agricultural harvesting machine having a pivotable receiving device for an agricultural implement, including:
   a support wheel; and
   a wheel lifting cylinder connecting the support wheel with the receiving device and for adjusting a load on the support;
   a drive axle and a steering axle associated with the agricultural harvesting machine;
   a first load-sensing transducer associated with the drive axle and a second load-sensing transducer associated with the steering axle; and
   at least one electronic calculating unit in communication with the first and second load-sensing transducers, wherein the first and second load-sensing transducers transmit load-dependent input signals to the electronic calculating unit and wherein the electronic calculating unit generates a control signal as a function of the load-dependent input signals to regulate the pressure of the wheel lifting cylinder.

2. A support wheel assembly for an agricultural harvesting machine according to claim 1, wherein the wheel lifting cylinder is lockable to prevent movement of the support wheel relative to the receiving device.

3. A support wheel assembly for an agricultural harvesting machine according to claim 1, further including at least one proportional valve associated with the wheel lifting cylinder wherein the load on the support wheel is dynamically adaptable as a function of the load on the drive axle and the load on the steering axle by means of the proportional valve.

4. A support wheel assembly for an agricultural harvesting machine according to claim 1, wherein the electronic calculating unit controls adjustment of the ratio of the loads of the support wheel, driving axle, and steering axle relative to one another.

5. A support wheel assembly for an agricultural harvesting machine according to claim 1, wherein the wheel lifting cylinder is oriented generally vertically.

6. A support wheel assembly for an agricultural harvesting machine according to claim 1, further including: a traction cylinder connected with both the receiving device and the agricultural harvesting machine.

7. A support wheel assembly for an agricultural harvesting machine according to claim 1, wherein the wheel lifting cylinder raises and lowers the support wheel relative to the receiving device in a generally vertical direction.

8. A support wheel assembly for an agricultural harvesting machine according to claim 1, further including a steering mechanism associated with the support wheel, whereby the support wheel is steerable.

9. A support wheel assembly for an agricultural harvesting machine according to claim 1, wherein the control system is fluid powered and includes at least one pressure-limiting valve.

10. A support wheel assembly for an agricultural harvesting machine according to claim 9, having a pivotable receiving device for an agricultural implement, including:
    a support wheel;
    a wheel lifting cylinder connecting the support wheel with the receiving device and for adjusting a load on the support wheel;
    at least one device lifting cylinder connecting the receiving device with the agricultural machine; and
    a control system coupled with both the wheel lifting cylinder and the device lifting cylinder;
    wherein the control system is fluid powered and includes at least one pressure-limiting valve, an accumulator and at least one non-return valve associated with the pressure-limiting valve.

11. A support wheel assembly for an agricultural harvesting machine having a pivotable receiving device for an agricultural implement according to claim 1, further including a linkage connected with the support wheel and pivotably connected with a front axle of the agricultural harvesting machine.

12. A support wheel assembly for an agricultural implement carried on a receiving device of an agricultural machine as set forth in claim 1, further including:
    a second support wheel; and
    a second wheel lifting cylinder whereby a load on each support wheel is adjusted independently of the other.

13. A support wheel assembly for an agricultural implement carried on a receiving device of an agricultural machine as set forth in claim 1, wherein the calculating unit is operative for regulating the bearing pressure of the agricultural implement by adjusting a load on the support wheel.

14. A support wheel assembly for an agricultural harvesting machine according to claim 1, in which there are a plurality of support wheels and a wheel lifting cylinder for each support wheel connecting the support wheel to the receiving device.

15. A support wheel assembly for an agricultural harvesting machine according to claim 1, further including:
    at least one device lifting cylinder connecting the receiving device with the agricultural machine; and
    a control system coupled with both the wheel lifting cylinder and the device lifting cylinder.

16. A support wheel assembly for an agricultural harvesting machine according to claim 9, having a pivotable receiving device for an agricultural implement, including:
    a support wheel;
    a wheel lifting cylinder connecting the support wheel with the receiving device and for adjusting a load on the support wheel;
    at least one device lifting cylinder connecting the receiving device with the agricultural harvesting machine; and
    wherein the load on the support wheel is determined by a piston-face ratio between the wheel lifting cylinder and the device lifting cylinder.

17. A support wheel assembly for an agricultural harvesting machine according to claim 16, wherein the piston-face ratio is proportional to the load ratio between the load on the support wheel and the load of the wheel lifting cylinder.

18. A support wheel assembly for an agricultural implement carried on a receiving device of an agricultural machine including:
    a support wheel;
    means for connecting the support wheel with the receiving device;
    means for adjusting the receiving device relative to the support wheel;
    wherein the means for adjusting the receiving device relative to the support wheel is operative for regulating the bearing pressure of the agricultural implement by adjusting a load on the support wheel; and
    means for measuring loads on a drive axle and a steering axle of the agricultural machine;
    wherein the adjusting of the load on the support wheel includes adjusting the load on the support wheel as a function of the loads on the drive axle and the steering axle.

19. A support wheel assembly for an agricultural implement carried on a receiving device of an agricultural machine as set forth in claim 18, wherein the adjusting of the load on the support wheel as a function of the loads on the drive axle and the steering axle is accomplished by dynamically adapting the load on the support wheel to the loads on the drive axle and steering axle.

* * * * *